United States Patent
Yasuda

(10) Patent No.: US 8,526,943 B2
(45) Date of Patent: *Sep. 3, 2013

(54) MOBILE RADIO TERMINAL

(71) Applicant: Fujitsu Toshiba Mobile Communications Limited, Kawasaki (JP)

(72) Inventor: Chikara Yasuda, Tokyo (JP)

(73) Assignee: Fujitsu Mobile Communications Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/690,875

(22) Filed: Nov. 30, 2012

(65) Prior Publication Data

US 2013/0090114 A1 Apr. 11, 2013

Related U.S. Application Data

(63) Continuation of application No. 11/950,205, filed on Dec. 4, 2007, now Pat. No. 8,346,246.

(30) Foreign Application Priority Data

May 15, 2007 (JP) ................................. 2007-128767

(51) Int. Cl.
*H04W 4/00* (2009.01)

(52) U.S. Cl.
USPC .......................... 455/432.1; 455/425; 370/328

(58) Field of Classification Search
USPC ............... 455/411–550.1; 370/328, 335, 350
See application file for complete search history.

(56) References Cited

U.S. PATENT DOCUMENTS

| 5,629,710 | A | 5/1997 | Sawada |
| 7,561,543 | B2 | 7/2009 | Zalio |
| 7,599,695 | B2 | 10/2009 | Igarashi et al. |
| 2006/0246890 | A1 | 11/2006 | Yasuda et al. |
| 2007/0135140 | A1 | 6/2007 | Tervo |

FOREIGN PATENT DOCUMENTS

JP 2006-311329 A 11/2006

OTHER PUBLICATIONS

3GPP TS 24.008 V5.16.0 (Jun. 2006) 3rd Generation Partnership Project: Technical Specification Group Core Network and Terminals; Mobile Radio Interface Layer 3 specification; Core network protocols; Stage 3 (Release 5), pp. 1-448.
3GPP TS 25.304V5.9.0 (Jun. 2005), 3rd Generation Partnership Project: Technical Specification Group Radio Access Network; User Equipment (UE) procedures in idle mode and procedures for cell reelection in connected mode (Relesase 5), pp. 1-44.
3GPP TS 25.331 V5.20.0 (Sep. 2007), pp. 1-1045.

*Primary Examiner* — Charles Appiah
*Assistant Examiner* — Alexander Yi
(74) *Attorney, Agent, or Firm* — Maschoff Brennan

(57) ABSTRACT

A location registration control unit stores PSC used in a roaming prohibition cell in a prohibition cell list storage area. After that, if the reselection of cells is required for the reason that the receiving conditions become worse or other reasons, a reselection control unit detects PSC of neighbor cells, creates a list of the detected PSC regarded as candidates, stores the list in a candidate cell list storage area, receives notification information from the cell using the PSC other than the roaming prohibition cell in the list, and executes reselection.

24 Claims, 9 Drawing Sheets

| PSC | Count values |
|---|---|
| $PN_1$ | 3 |
| $PN_2$ | 2 |
| $PN_3$ | 2 |
| $PN_4$ | 2 |
| $PN_5$ | 2 |

401a     401b

| PSC | Prohibition end time Tm |
|---|---|
| $PN_1$ | $T_1$ |
| $PN_2$ | $T_2$ |
| $PN_3$ | $T_3$ |
| $PN_4$ | $T_4$ |
| $PN_5$ | $T_5$ |

402a    402b

| PSC | Position data Pm |
|---|---|
| $PN_1$ | $P_1$ |
| $PN_2$ | $P_2$ |
| $PN_3$ | $P_3$ |
| $PN_4$ | $P_4$ |
| $PN_5$ | $P_5$ |

403a     403b

MOBILE RADIO TERMINAL

CROSS-REFERENCE TO RELATED APPLICATIONS

This patent application is a continuation of U.S. patent application Ser. No. 11/950,205, filed Dec. 4, 2007, which claims priority to Japanese Application No. 2007-128767, filed May 5, 2007. The foregoing Patent applications are incorporated herein by reference.

BACKGROUND OF THE INVENTION

1. Field of the Invention

The present invention relates to a mobile radio terminal capable of roaming domestically or overseas.

2. Description of the Related Art

In a cellular mobile radio terminal (for example, cf. 3GPP STANDARDS TS25.331, TS25.304, TS24.008), neighbor cells are searched at a standby time to maintain preferable receiving quality at any time. If, as a result of the search, a cell of preferable receiving quality is detected and it is discriminated on the basis of predetermined discrimination standards that a serving cell needs to be changed, the mobile radio terminal receives information from the cell and discriminates the necessity of location registration from a network number, location registration area number, and the like included in the received information.

If the mobile radio terminal discriminates that the location registration needs to be executed, the mobile radio terminal executes a location registration process.

At this time, in response to the location registration request transmitted to the network, a cause value indicating a location registration rejection such as roaming prohibition is often transmitted from the network to reject the location registration. In this case, the mobile radio terminal recognizes that the location registration area where the location registration request has been made is an area of roaming prohibition, from the notification, and stores the location registration area number as a roaming prohibition area.

After that, when the mobile radio terminal receives the information of the neighbor cell, the mobile radio terminal collates the location registration area number notified by the information with the location registration area number of the roaming prohibition area stored in the terminal. If the location registration area numbers match, the mobile radio terminal recognizes that the location registration area is the area of roaming prohibition, and operates not to execute the location registration.

In the mobile radio terminal of the cellular system, the cell is reselected in accordance with movement, in the above steps. However, if the condition that the receiving quality of the roaming prohibition cell is high is maintained as a result of search of the neighbor cell, the process of receiving the information from the roaming prohibition cell is repeated and the current consumption is therefore increased.

To discriminate whether the cell detected by the search prohibits roaming, it is necessary to receive the information and discriminate whether the network number and the location registration area number in the information match those of the roaming prohibition cell stored in the mobile radio terminal, as described above. For this reason, the process of receiving the information is required, which results in the above problem.

To solve this problem, a method of using the frequency of the prohibition cell as a prohibition frequency, excluding the prohibition frequency from the search and not executing the process of receiving the information of the prohibition cell has been proposed (cf., for example, Jpn. Pat. Appln. KOKAI Publication No. 2006-311329).

Since reception in a specified frequency is prohibited in this method, no problem occurs in a case of prohibiting roaming in unit of network. However, if roaming is prohibited in unit of location registration area, in the networks of the same frequency, the location registration area where roaming is not prohibited is regarded as the roaming prohibition area and roaming cannot be executed.

BRIEF SUMMARY OF THE INVENTION

The present invention has been accomplished to solve the above-described problems. The object of the present invention is to provide a mobile radio terminal, capable of reducing a power consumed for the process of receiving the information from the base station and preventing delay in cell detection caused by an unnecessary information receiving process, even when roaming is prohibited in unit of location registration area.

To achieve this object, an aspect of the present invention is a mobile radio terminal, establishing radio communications with a base station which is accommodated in a mobile communications network and which forms a cell. The mobile radio terminal comprises: a storage unit which stores identification information of a cell where roaming is rejected; a detecting unit which detects cells by executing reception using a plurality of elements of the identification information if a receiving quality from the base station is deteriorated; and a receiving unit which receives notification information from cells other than cells having identification information stored in the storage unit, of the cells detected by the detecting unit.

In the present invention, the identification information of the cell where roaming is rejected is stored, the cell is detected in a case where the receiving quality of the reception from the base station is deteriorated, and notification information is received from the cell other than the cell having identification information stored.

Since the reception of the identification information from the cell where roaming is rejected is not executed, the present invention can provide a mobile radio terminal, capable of reducing a power consumed for the process of receiving the information from the base station and preventing delay in cell detection caused by an unnecessary information receiving process, even when roaming is prohibited in each cell.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be described below with reference to the accompanying drawings.

(First Embodiment)

Figures 1, 2:
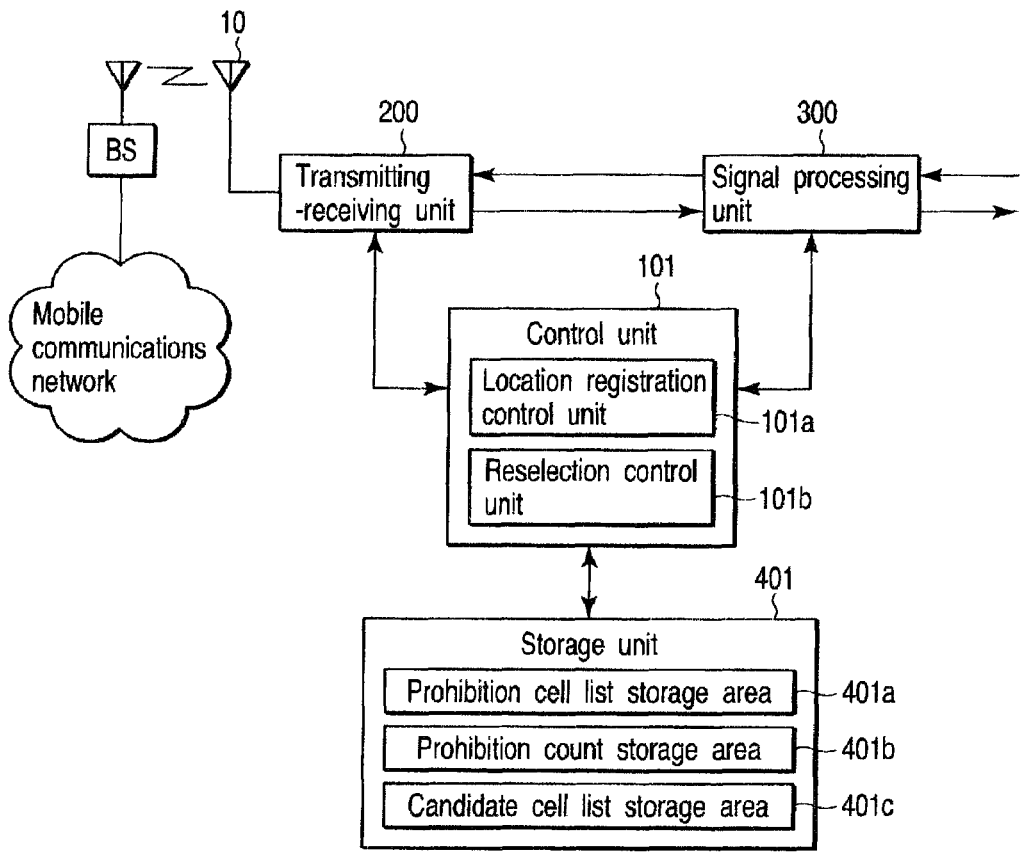
FIG. 1 is a block diagram showing a configuration of a mobile radio terminal according to a first embodiment of the present invention.
FIG. 2 is an illustration describing information stored in a storage unit of the mobile radio terminal shown in FIG. 1.

FIG. 1 shows a configuration of a mobile radio terminal according to a first embodiment of the present invention.

The mobile radio terminal comprises an antenna 10, a transmitting-receiving unit 200, a signal processing unit 300, a storage unit 401, and a control unit 101. The mobile radio terminal is employed in, for example, a mobile radio communications system of W-CDMA (Wideband Code Division Multiple Access) to execute speech communications and data communications.

The transmitting-receiving unit 200 executes radio communications in W-CDMA with the base station BS accommodated in a mobile communications network via the antenna 10. More specifically, a carrier frequency and PSC are directed to the transmitting-receiving unit 200 by the control unit 101, on the basis of a modulation signal generated by the signal processing unit 300, and the transmitting-receiving unit 200 generates a radio signal of the carrier frequency by using the PSC.

In addition, a carrier frequency and PSC are directed to the transmitting-receiving unit 200 by the control unit 101, and the transmitting-receiving unit 200 receives a radio signal of the carrier frequency by using the PSC. The result of reception is output to the signal processing unit 300 and the control unit 101. The transmitting-receiving unit 200 has a function of detecting quality of the received signal, and notifies the detected receiving quality to the control unit 101.

The signal processing unit 300 encodes a transmission speech signal. The signal processing unit 300 also generates the modulation signal on the basis of the speech data and the other data obtained by encoding, and outputs the modulation signal to the transmitting-receiving unit 200. In addition, the signal processing unit 300 demodulates the signal received by the transmitting-receiving unit 200 and decodes the result of modulation to obtain speech data and the like and detect the signal transmitted from the base station BS.

The storage unit 401 stores control programs and control data of the mobile radio terminal, inherent identification information assigned to the mobile radio terminal and the user, and a number of PSC (Primary Scrambling Code), besides telephone book data associating names with telephone numbers, data obtained from data communications, and downloaded data. The storage unit 401 comprises a prohibition cell list storage area 401a, a prohibition count storage area 401b, a candidate cell list storage area 401c and the like.

The prohibition cell list storage area 401a stores identification information PN of PSC used for communications in a cell where roaming is prohibited, as shown in FIG. 2. In this example, the prohibition cell list storage area 401a stores identification information of five PSC $PN_1$-$PN_5$, and older information is erased when new information is stored.

The prohibition count storage area 401b is an area where values obtained by counting by PSC the number of times of checking possibility in receiving the notified information in a roaming prohibition cell by a reselection process to be described later are stored as shown in FIG. 2. The candidate cell list storage area 401c is an area where a list of identification information of PSC of candidate cells arranged in the order of higher receiving quality is stored.

The control unit 101 controls all the units of the mobile radio terminal on the basis of the control programs and control data stored in the storage unit 401, executes control on a staying cell, requests the base station BS to execute the location registration, manages radio resources of the mobile radio terminal, and controls setting and opening of a radio connection.

More specifically, the control unit 101 comprises a location registration control unit 101a configured to execute the location registration for the base station BS if necessary, a reselection control unit 101b configured to execute the reselection of cells if the receiving condition becomes worse, and the like.

The mobile radio terminal comprises a speaker configured to output a reception speech signal, a microphone configured to input a transmission speech signal, a unit configured to convert the speech data into the reception speech signal, a unit configured to convert the transmission speech signal into the speech data, a display unit configured to display images on the basis of the reception data, an operation unit configured to accept a request from the user, and the like, though they are not shown in FIG. 1.

Next, operations of the mobile radio terminal having the above-explained configuration will be described. In the following descriptions, steps of establishing a communications link with the base station BS, control to implement speech communications and data communications, and registration, calling and edition of telephone book data and the like are omitted, but operations relating to location registration and reselection are described.

Figure 3:
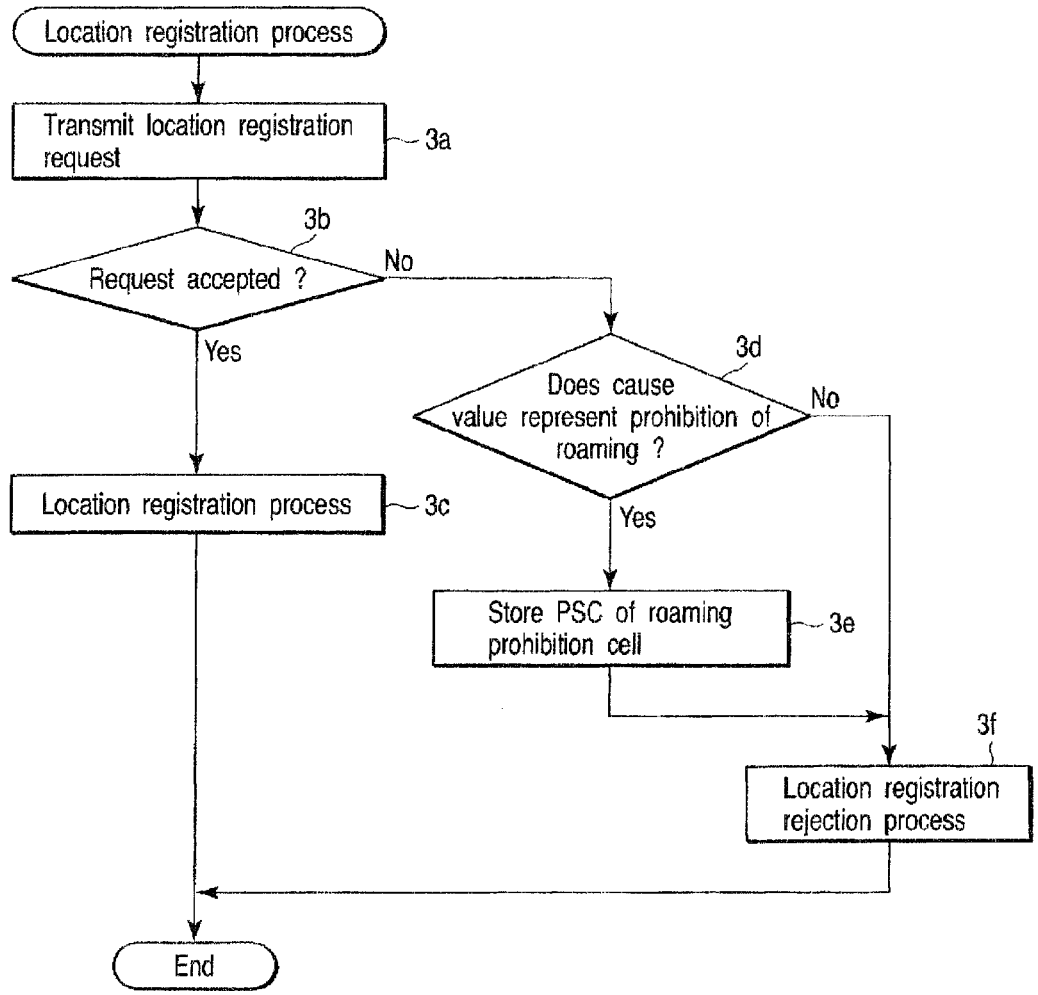
FIG. 3 is a flowchart describing a location registration process of the mobile radio terminal shown in FIG. 1.

FIG. 3 shows a flowchart of a location registration process, which is executed by the location registration control unit 101a of the control unit 101. A control program for implementing a control represented by the flowchart is stored in the storage unit 401. This process is implemented if a cell for location registration can be specified.

First, in step 3a, the location registration control unit 101a controls the transmitting-receiving unit 200 to transmit a location registration request to a cell which is specified by the control unit 101 and is to be subjected to location registration (for example, a cell having preferable receiving quality detected by the transmitting-receiving unit 200, as a result of the cell search). The location registration control unit 101a proceeds to step 3b.

The transmitting-receiving unit 200 transmits the location registration request to the cell (base station BS). More specifically, the location registration control unit 101a notifies the transmitting-receiving unit 200 of PSC used in the cell which is to be subjected to location registration. The transmitting-receiving unit 200 makes the location registration request to the cell by transmitting the location registration request by using the notified PSC.

In step 3b, the location registration control unit 101a controls the transmitting-receiving unit 200 to receive a response signal responding to the location registration request from the cell. More specifically, the location registration control unit 101a notifies the identification information of the PSC used in the cell to the transmitting-receiving unit 200, and the transmitting-receiving unit 200 receives the response signal by using the PSC corresponding to the notified identification information.

The location registration control unit 101a refers to the response signal from the cell detected by the signal processing unit 300 and discriminates whether or not the cell accepts the location registration request made in step 3a. If the response signal indicates the cell accepts (permits) the location registration request, the location registration control unit 101a proceeds to step 3c. If the response signal indicates the cell does not accept (rejects) the location registration request, the location registration control unit 101a proceeds to step 3.

In step 3c, the location registration control unit 101a controls the transmitting-receiving unit 200 and the signal processing unit 300 to execute the location registration process and end this process. More specifically, in the location registration process, the location registration control unit 101a establishes communications with the base station BS belonging to the cell, transmits the identification information of the own terminal and the like, and executes registration in the position management database in the network.

In step 3d, the location registration control unit 101a refers to a cause value included in the response signal received from the cell and detects the reason why the location registration request has not been accepted. The location registration control unit 101a proceeds to step 3e if the cause value represents prohibition of roaming or proceeds to step 3f if the cause value represents elements other than prohibition of roaming.

In step 3e, the location registration control unit 101a stores identification information $PN_n$ of the PSC corresponding to the cell where roaming is prohibited, in the prohibition cell list storage area 401a, and proceeds to step 3f.

In step 3f, the location registration control unit 101a executes a location registration rejection process and ends this process. More specifically, in the location registration rejection process, the location registration control unit 101a erases the identification information of the area, and stores the identification information of the network and the area in the prohibition network list and the prohibition area list, in accordance with the cause value, and ends the location registration process. These processes are provided in 3GPP STANDARDS TS24.018, TS25.331, TS25.304, TS24.008.

Figure 4:
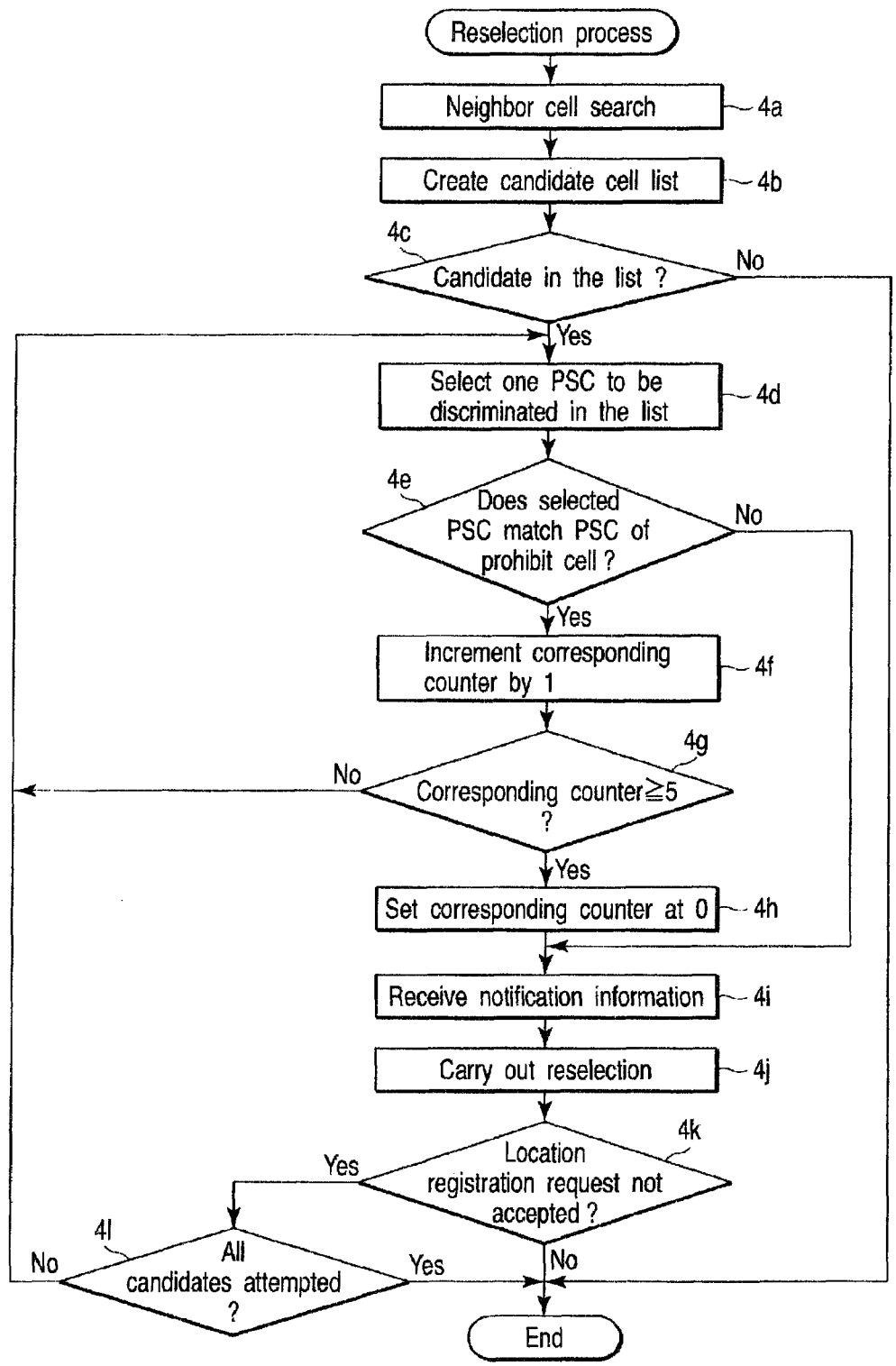
FIG. 4 is a flowchart describing a reselection process of the mobile radio terminal shown in FIG. 1.

FIG. 4 is a flowchart showing the reselection process, which is executed by the reselection control unit 101b of the control unit 101. A control program for implementing a control shown in the flowchart is stored in the storage unit 401. This process is executed when it is discriminated that the reselection of cells needs to be executed since the receiving quality of the currently serving cell is deteriorated, for example, when it is discriminated that the reselection of cells needs to be executed at every discrimination of the receiving quality of the currently serving cell at every discontinuous reception.

First, in step 4a, the reselection control unit 101b notifies the transmitting-receiving unit 200 of the identification of a plurality of PSC to urge the transmitting-receiving unit 200 to execute neighbor cell search. Then, the reselection control unit 101b proceeds to step 4b. The transmitting-receiving unit 200 receives pilot signals transmitted from the cell and detects their receiving qualities, by sequentially using PSC corresponding to the identification information notified by the reselection control unit 101b, and notifies the control unit 101 of the detected receiving qualities together with the identification information of the PSC.

In step 4b, the reselection control unit 101b detects the PSC by which receiving qualities higher than predetermined receiving qualities can be obtained, on the basis of the receiving qualities notified by the transmitting-receiving unit 200 in step 4a, creates a candidate list in which elements of the identification information of the detected PSC are arranged in an order of higher receiving qualities, and stores the candidate list in the candidate cell list storage area 401c. Then, the reselection control unit 101b proceeds to step 4c. In other words, in step 4b, the reselection control unit 101b creates a candidate list in which the PSC considered desirable as candidates of the reselection are arranged in an order of higher possibilities.

In step 4c, the reselection control unit 101b discriminates whether or not the identification information of at least one PSC is included in the candidate list created in step 4b. If the identification information of at least one PSC is included in the candidate list, the reselection control unit 101b proceeds to step 4d. If the candidate list does not include the identification information of any PSC, the reselection control unit 101b ends the process. If it is discriminated that the reselection of cells needs to be executed again at a next discontinuous reception time, the reselection control unit 101b executes this flow from the first step.

In step 4d, the reselection control unit 101b selects one PSC, in the candidate list stored in the candidate cell list storage area 401c, and proceeds to step 4e. When the reselection control unit 101b proceeds from step 4c to step 4d, the reselection control unit 101b selects the PSC of the highest order in the candidate list. When the reselection control unit 101b proceeds from step 4g or step 4l to step 4d, the reselection control unit 101b selects the PSC of the order next to the PSC selected in previous step 4d.

In other words, for example, if the reselection control unit 101b selects the PSC of the highest order in previous step 4d, the reselection control unit 101b selects the PSC of the second order in current step 4d. If the reselection control unit 101b selects the PSC of the third order in previous step 4d, the reselection control unit 101b selects the PSC of the fourth order in current step 4d. If the reselection control unit 101b selects the PSC of the lowest (fifth) order in previous step 4d, the reselection control unit 101b selects the PSC of the highest (first) order in current step 4d.

In step 4e, the reselection control unit 101b discriminates whether or not the identification information $PN_x$ of the PSC selected in step 4d is stored in the prohibition cell list storage area 401a. If the identification information $PN_x$ matches any one of $PN_1$-$PN_5$ stored in the prohibition cell list storage area 401a, i.e. if the identification information $PN_x$ is the PSC of the prohibition cell, the reselection control unit 101b proceeds to step 4f. If the identification information $PN_x$ does not match any one of $PN_1$-$PN_5$, i.e. if the identification information $PN_x$ is not the PSC of the prohibition cell, the reselection control unit 101b proceeds to step 4i.

In step 4f, the reselection control unit 101b increments the count value of the prohibition count storage area 401b corresponding to the identification information $PN_x$ of the PSC selected in step 4d, by one. Then, the reselection control unit 101b proceeds to step 4g.

In step 4g, the reselection control unit 101b discriminates whether or not the count value of the prohibition count storage area 401b corresponding to the identification information $PN_x$ of the PSC selected in step 4d, is equal to or more than a preset threshold value "5". If the count value of the prohibition count storage area 401b is equal to or more than the preset threshold value, i.e. if the loop process in steps 4d to 4g corresponding to the identification information $PN_x$ the PSC selected in step 4d is repeated at the times equal to or more than a preset threshold value, the reselection control unit 101b proceeds to step 4h. If the count value of the prohibition count storage area 401b is less than the preset threshold value, i.e. if the loop process in steps 4d to 4g is not repeated at the times equal to or more than a preset threshold value, the reselection control unit 101b proceeds to step 4d.

In step 4h, the reselection control unit 101b resets the count value of the prohibition count storage area 401b corresponding to the identification information $PN_x$ of the PSC selected in step 4d to 0. The reselection control unit 101b proceeds to step 4i.

In step 4i, the reselection control unit 101b notifies of the identification information $PN_x$ of the PSC selected in step 4d and controls the transmitting-receiving unit 200 to receive the notification information transmitted from the cell using the PSC. Then, the reselection control unit 101b proceeds to step 4j. The transmitting-receiving unit 200 executes the reception using the PSC corresponding to the identification information notified by the reselection control unit 101b, and the signal processing unit 300 thereby detects the notification information from the received signal.

The reselection control unit 101b executes the reselection process in step 4j, and then proceeds to step 4k. The reselection process includes processes of reading the location registration area number from the notification information received in step 4i and, if the location registration area number is different from the currently registered location registration area number, controlling the transmitting-receiving unit 200 and the signal processing unit 300 to transmit the location registration request to the base station BS that has transmitted the notification information received in step 4i, under predetermined protocol.

In step 4k, the reselection control unit 101b discriminates whether or not the location registration request made in step 4j has been accepted. If the location registration request has not been accepted, the reselection control unit 101b proceeds to step 4l. If the location registration request has been accepted and if the location registration does not need to be executed, the reselection control unit 101b controls the transmitting-receiving unit 200 and the signal processing unit 300 to establish communications with the base station BS, start camping for an incoming call, and ends this process, according to a predetermined protocol.

In step 4l, the reselection control unit 101b discriminates whether or not the notification information has been received in step 4i at, at least, one time in relation to all the PSC included in the candidate list created in step 4b. If the notification information has been received in step 4i at, at least, one time, the reselection control unit 101b ends this process. Then, if it is discriminated that the reselection of the cells is required again at a next discontinuous reception, the reselection control unit 101b executes this flow from the first step. If the notification information has not been received in relation to all the PSC, the reselection control unit 101b proceeds to step 4d.

In the mobile radio terminal having the above-described configuration, the PSC used in the roaming prohibition cell is prestored. After that, if the selection of the cells is required for the reason that the receiving conditions become worse or other reasons, the PSC of the neighbor cells are detected and listed as candidates, the notification information is received from the cell using the PSC other than the roaming prohibition cell in the list, and the reselection is executed.

Therefore, since the notification information is received by positively using the PSC other than the PSC of the cell which has been discriminated as the roaming prohibition cell, reception of the notification information from the roaming prohibition cell is restricted even if the roaming prohibition cell is detected as the neighbor cell (candidate for the reselection).

For this reason, even if roaming is prohibited in each cell, reception of the notification information from the roaming prohibition cell which cannot consequently carry out the reselection is restricted (limited) and unnecessary electric power to be wasted for this process can be reduced. In addition, delay in detecting the cell due to unnecessary reception of the notification information can be prevented.

In general, since the PSC is repeatedly used in the same network, the cell cannot be uniquely distinguished according to the PSC but, normally, the assignment of the PSC to the cell is executed such that the same PSC is not used in a plurality of cells in a comparatively small region. However, since the PSC is finite, the same PSC may be repeatedly used in the entire network. In other words, the PSC used in the roaming prohibition cell may be used in a remote cell where roaming can be executed. If it is used as the PSC of the roaming prohibition cell, it may cause any problems at the moving mobile radio terminal.

In the mobile radio terminal having the above-described configuration, however, if the PSC included in the candidate list of the neighbor cell is the PSC of the roaming prohibition cell, the counter is incremented until the count value reaches a predetermined count and then the notification information is received from the cell using the PSC.

For this reason, even if the mobile radio terminal moves to the cell where roaming can be executed and which uses the same PSC as the PSC of the roaming prohibition cell, the notification information can be received when the time elapses until the counter counts a predetermined value, and occurrence of the problem can be prevented.

In addition, after the counter is incremented until the count value reaches a predetermined count, the notification information is received from the cell using the PSC. If the used PSC is the PSC of the roaming prohibition cell, the count value is reset to 0, the counter is incremented until the count value reaches a predetermined count, and the notification information is received from the cell using the PSC.

For this reason, even if the count value of the counter reaches a predetermined count and then desirable receiving quality can be obtained as the candidates for the reselection, the notification information is not sequentially received. In addition, even if the used PSC is discriminated as the PSC of the roaming prohibition cell, the notification information is received again from the cell using the PSC when the count value of the counter reaches a predetermined count. In other words, even if the used PSC is the PSC of the roaming prohibition cell, the notification information is discontinuously received from the cell using the PSC and the above problem caused by a movement to be made later can be thereby prevented.

Incidentally, when the power consumption was measured under the condition that a single roaming prohibition cell is always detected at the highest quality, an effect of reducing the power consumption at 40% was confirmed under certain conditions, by executing the method of receiving the notification information at one time at every five times of detection, as compared with a case where the present invention is not employed.

(Second Embodiment)

Next, a mobile radio terminal according to the second embodiment of the present invention will be described.

Figures 5, 6:
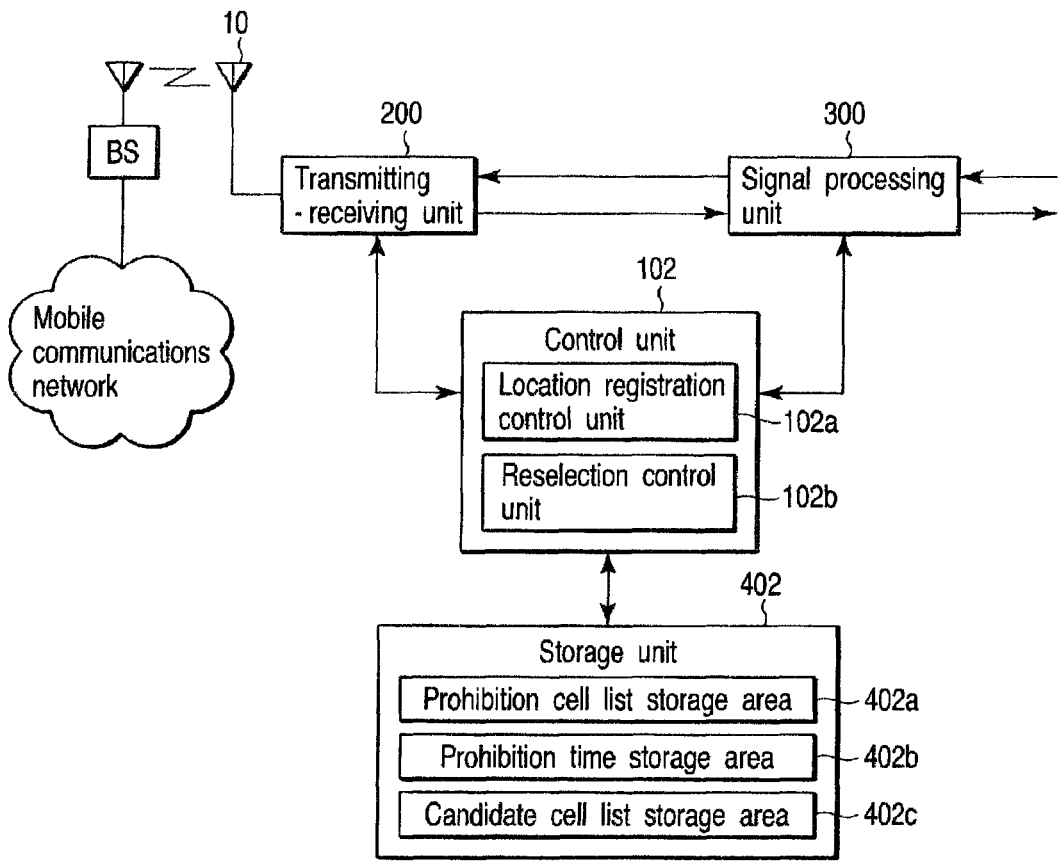
FIG. 5 is a block diagram showing a configuration of a mobile radio terminal according to a second embodiment of the present invention.
FIG. 6 is an illustration describing information stored in a storage unit of the mobile radio terminal shown in FIG. 5.

FIG. 5 shows a configuration of a mobile radio terminal according to the second embodiment.

The mobile radio terminal comprises an antenna 10, a transmitting-receiving unit 200, a signal processing unit 300, a storage unit 402, and a control unit 102. The mobile radio terminal is employed in, for example, a mobile radio communications system of W-CDMA (Wideband Code Division Multiple Access) to execute speech communications and data communications.

The transmitting-receiving unit 200 executes radio communications in W-CDMA with the base station BS accommodated in a mobile communications network via the antenna 10. More specifically, a carrier frequency and PSC are directed to the transmitting-receiving unit 200 by the control unit 102, on the basis of a modulation signal generated by the signal processing unit 300, and the transmitting-receiving unit 200 generates a radio signal of the carrier frequency by using the PSC.

In addition, a carrier frequency and PSC are directed to the transmitting-receiving unit 200 by the control unit 102, and the transmitting-receiving unit 200 receives a radio signal of the carrier frequency by using the PSC. The result of reception is output to the signal processing unit 300 and the control unit 102. The transmitting-receiving unit 200 has a function of detecting quality of the received signal, and notifies the detected receiving quality to the control unit 102.

The signal processing unit 300 encodes a transmission speech signal. The signal processing unit 300 also generates the modulation signal on the basis of the speech data and the other data obtained by encoding, and outputs the modulation signal to the transmitting-receiving unit 200. In addition, the signal processing unit 300 demodulates the signal received by the transmitting-receiving unit 200 and decodes the result of modulation to obtain speech data and the like and detect the signal transmitted from the base station BS.

The storage unit 402 stores control programs and control data of the mobile radio terminal, inherent identification information assigned to the mobile radio terminal and the user, and a number of PSC (Primary Scrambling Code), besides telephone book data associating names with telephone numbers, data obtained from data communications, and downloaded data. The storage unit 402 comprises a prohibition cell list storage area 402a, a prohibition time storage area 402b, a candidate cell list storage area 402c and the like.

The prohibition cell list storage area 402a stores identification information PN of PSC used for communications in a cell where roaming is prohibited, as shown in FIG. 6. In this example, the prohibition cell list storage area 402a stores identification information of five PSC $PN_1$-$PN_5$, and older information is erased when new information is stored.

The prohibition time storage area 402b is an area where reselection prohibition end time Tm is stored by each PSC used for the communications in the cell in which roaming is prohibited, as shown in FIG. 6. The candidate cell list storage area 402c is an area where a list of identification information of PSC of candidate cells arranged in the order of higher receiving quality is stored.

The control unit 102 controls all the units of the mobile radio terminal on the basis of the control programs and control data stored in the storage unit 402, executes control on a staying cell, requests the base station BS to execute the location registration, manages radio resources of the mobile radio terminal, and controls setting and opening of a radio connection. The control unit 102 has a function of measuring the time.

Here specifically, the control unit 102 comprises a location registration control unit 102a configured to execute the location registration for the base station BS if necessary, a reselection control unit 102b configured to execute the reselection of cells if the receiving condition becomes worse, and the like.

The mobile radio terminal comprises a speaker configured to output a reception speech signal, a microphone configured to input a transmission speech signal, a unit configured to convert the speech data into the reception speech signal, a unit configured to convert the transmission speech signal into the speech data, a display unit configured to display images on the basis of the reception data, an operation unit configured to accept a request from the user, and the like, though they are not shown in FIG. 5.

Next, operations of the mobile radio terminal having the above-explained configuration will be described. In the following descriptions, steps of establishing a communications link with the base station BS, control to implement speech communications and data communications, and registration, calling and edition of telephone book data and the like are omitted, but operations relating to location registration and reselection are described.

Figure 7:
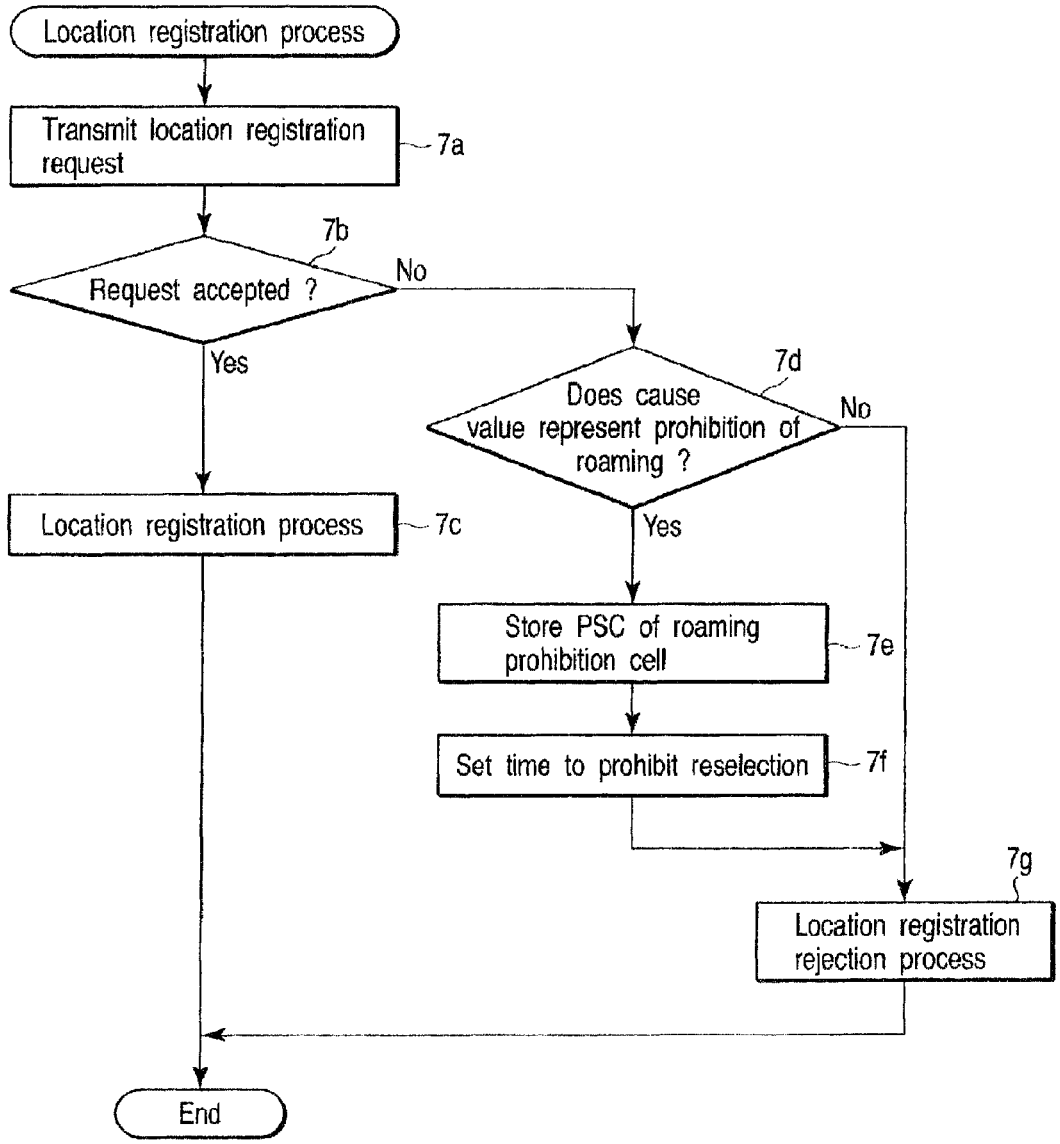
FIG. 7 is a flowchart describing a location registration process of the mobile radio terminal shown in FIG. 5.

FIG. 7 shows a flowchart of a location registration process, which is executed by the location registration control unit 102a of the control unit 102. A control program for implementing a control represented by the flowchart is stored in the storage unit 402. This process is implemented if a cell for location registration can be specified.

First, in step 7a, the location registration control unit 102a controls the transmitting-receiving unit 200 to transmit a location registration request to a cell which is specified by the control unit 102 and is to be subjected to location registration (for example, a cell having preferable receiving quality detected by the transmitting-receiving unit 200, as a result of the cell search). The location registration control unit 102a proceeds to step 7b.

The transmitting-receiving unit 200 transmits the location registration request to the cell (base station BS). More specifically, the location registration control unit 102a notifies the transmitting-receiving unit 200 of PSC used in the cell which is to be subjected to location registration. The transmitting-receiving unit 200 makes the location registration request to the cell by transmitting the location registration request by using the notified PSC.

In step 7b, the location registration control unit 102a controls the transmitting-receiving unit 200 to receive a response signal responding to the location registration request from the cell. More specifically, the location registration control unit 102a notifies the identification information of the PSC used in the cell to the transmitting-receiving unit 200, and the transmitting-receiving unit 200 receives the response signal by using the PSC corresponding to the notified identification information.

The location registration control unit 102a refers to the response signal from the cell detected by the signal processing unit 300 and discriminates whether or not the cell accepts the location registration request made in step 7a. If the response signal indicates the cell accepts (permits) the location registration request, the location registration control unit 102a proceeds to step 7c. If the response signal indicates the cell does not accept (rejects) the location registration request, the location registration control unit 102a proceeds to step 7d.

In step 7c, the location registration control unit 102a controls the transmitting-receiving unit 200 and the signal processing unit 300 to execute the location registration process and end this process. More specifically, in the location registration process, the location registration control unit 102a establishes communications with the base station BS belonging to the cell, transmits the identification information of the own terminal and the like, and executes registration in the position management database in the network.

In step 7d, the location registration control unit 102a refers to a cause value included in the response signal received from the cell and defects the reason why the location registration request has not been accepted. The location registration control unit 102a proceeds to step 7e if the cause value represents prohibition of roaming or proceeds to step 7g if the cause value represents elements other than prohibition of roaming.

In step 7e, the location registration control unit 102a stores identification information $PN_n$ of the PSC corresponding to the cell where roaming is prohibited, in the prohibition cell list storage area 402a. Then, the location registration control unit 102a proceeds to step 7f.

In step 7f, the location registration control unit 102a stores the time which has elapsed by a preset time (for example, 25 seconds) from the current time, as a prohibition end time, in association with the PSC stored in step 7e, in the prohibition time storage area 402b. The location registration control unit 102a proceeds to step 7g.

In step 7g, the location registration control unit 102a executes a location registration rejection process and ends this process. More specifically, in the location registration rejection process, the location registration control unit 102a erases the identification information of the area, and stores the identification information of the network and the area in the prohibition network list and the prohibition area list, in accordance with the cause value, and ends the location registration process. These processes are provided in 3GPP STANDARDS TS24.018, TS25.331, TS25.304, TS24.008.

Figure 8:
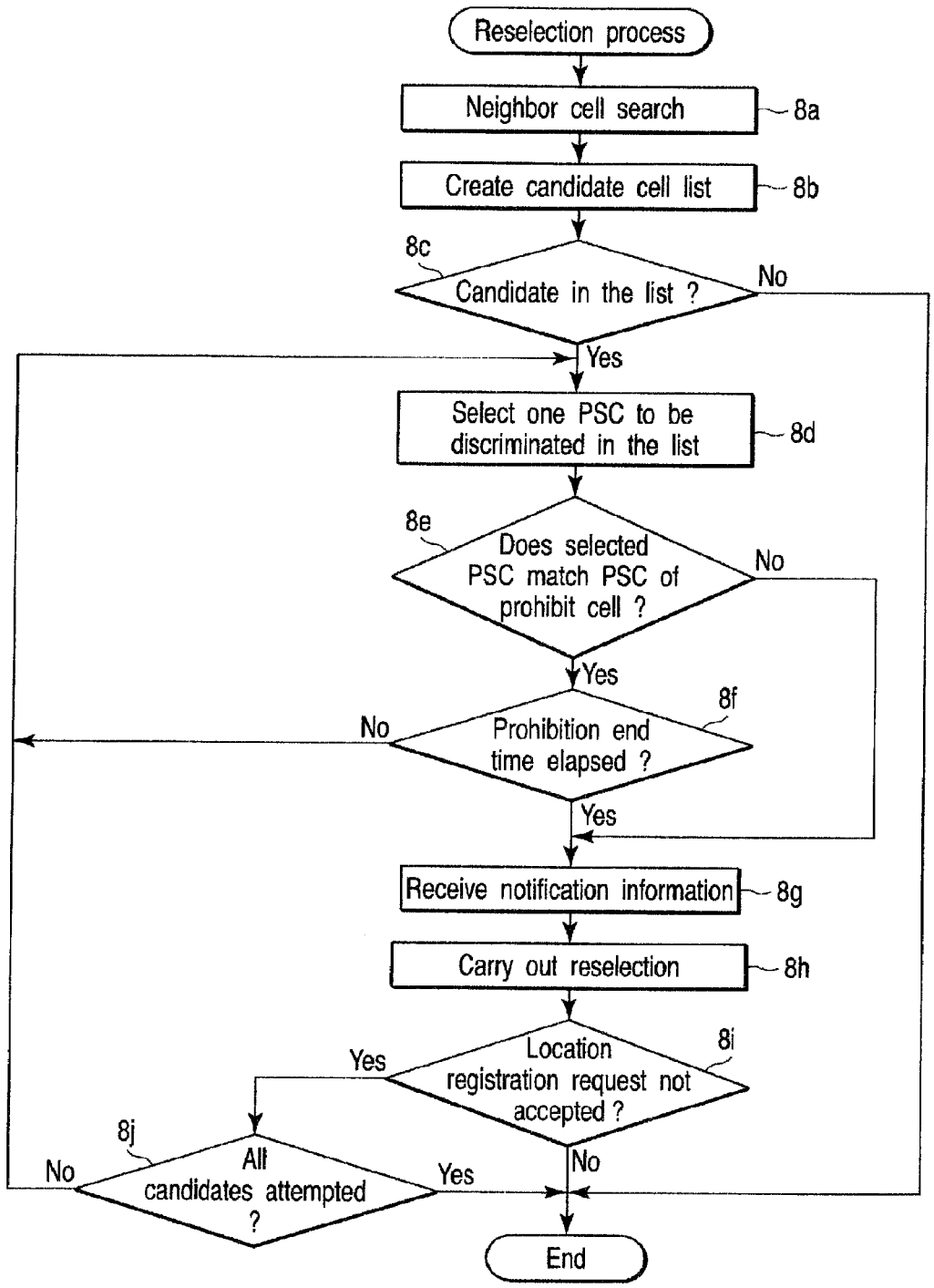
FIG. 8 is a flowchart describing a reselection process of the mobile radio terminal shown in FIG. 5.

FIG. 8 is a flowchart showing the reselection process, which is executed by the reselection control unit 102b of the control unit 102. A control program for implementing a control shown in the flowchart is stored in the storage unit 402. This process is executed when it is discriminated that the reselection of cells needs to be executed since the receiving quality of the currently serving cell is deteriorated, for example, when it is discriminated that the reselection of cells needs to be executed at every discrimination of the receiving quality of the currently serving cell at every discontinuous reception.

First, in step 8a, the reselection control unit 102b notifies the transmitting-receiving unit 200 of the identification of a plurality of PSC to urge the transmitting-receiving unit 200 to execute neighbor cell search. Then, the reselection control unit 102b proceeds to step 8b. The transmitting-receiving unit 200 receives pilot signals transmitted from the cell and detects their receiving qualities, by sequentially using PSC corresponding to the identification information notified by the reselection control unit 102b, and notifies the control unit 102 of the detected receiving qualities together with the identification information of the PSC.

In step 8b, the reselection control unit 102b detects the PSC by which receiving qualities higher than predetermined receiving qualities can be obtained, on the basis of the receiving qualities notified by the transmitting-receiving unit 200 in step 8a, creates a candidate list in which elements of the identification information of the detected PSC are arranged in an order of higher receiving qualities, and stores the candidate list in the candidate cell list storage area 402c. Then, the reselection control unit 102b proceeds to step 8c. In other words, in step 8b, the reselection control unit 102b creates a candidate list in which the PSC considered desirable as candidates of the reselection are arranged in an order of higher possibilities.

In step 8c, the reselection control unit 102b discriminates whether or not the identification information of at least one PSC is included in the candidate list created in step 8b. If the identification information of at least one PSC is included in the candidate list, the reselection control unit 102b proceeds to step 8d. If the candidate list does not include the identification information of any PSC, the reselection control unit 102b ends the process. If it is discriminated that the reselection of cells needs to be executed again at a next wait and discontinuous reception time, the reselection control unit 102b executes this flow from the first step.

In step 8d, the reselection control unit 102b selects one PSC, in the candidate list stored in the candidate cell list storage area 402c, and proceeds to step 8e. When the reselection control unit 102b proceeds from step 8c to step 8d, the reselection control unit 102b selects the PSC of the highest order in the candidate list. When the reselection control unit 102b proceeds from step 8f or step 8j to step 8d, the reselection control unit 102b selects the PSC of the order next to the PSC selected in previous step 8d.

In other words, for example, if the reselection control unit 102b selects the PSC of the highest order in previous step 8d, the reselection control unit 102b selects the PSC of the second order in current step 8d. If the reselection control unit 102b selects the PSC of the third order in previous step 8d, the reselection control unit 102b selects the PSC of the fourth order in current step 8d. If the reselection control unit 102b selects the PSC of the lowest (fifth) order in previous step 8d, the reselection control unit 102b selects the PSC of the highest (first) order in current step 8d.

In step 8e, the reselection control unit 102b discriminates whether or not the identification information $PN_x$ of the PSC selected in step 8d is stored in the prohibition cell list storage area 402a. If the identification information $PN_x$ matches any one of $PN_1$-$PN_5$ stored in the prohibition cell list storage area 402a, i.e. if the identification information $PN_x$ is the PSC of the prohibition cell, the reselection control unit 102b proceeds to step 8f. If the identification information $PN_x$ does not match any one of $PN_1$-$PN_5$, i.e. if the identification information $PN_x$ is not the PSC of the prohibition cell, the reselection control unit 102b proceeds to step 8g.

In step 8f, the reselection control unit 102b refers to prohibition end time Tx of the prohibition time storage area 402b corresponding to the identification information $PN_x$ of the PSC selected in step 8d, and discriminates whether or not the current time has passed the prohibition end time Tx. If the current time has passed the prohibition end time Tx, the reselection control unit 102b proceeds to step 4g. If the current time has not passed the prohibition end time Tx, the reselection control unit 102b proceeds to step 4d.

In step 8g, the reselection control unit 102b notifies the transmitting-receiving unit 200 of the identification information $PN_x$ of the PSC selected in step 8d, and controls the transmitting-receiving unit 200 to receive the identification information transmitted from the cell using the PSC. Then, the reselection control unit 102b proceeds to step 8h. The transmitting-receiving unit 200 executes the reception using the PSC corresponding to the identification information notified by the reselection control unit 102b, and the signal processing unit 300 thereby detects the notification information from the received signal.

The reselection control unit 102b executes the reselection process in step 8h, and then proceeds to step 8i. The reselection process includes processes of reading the location registration area number from the notification information received in step 8g and, if the location registration area number is different from the currently registered location registration area number, controlling the transmitting-receiving unit 200 and the signal processing unit 300 to transmit the location registration request to the base station BS that has transmitted the notification information received in step 8g, under a predetermined protocol.

In step 8i, the reselection control unit 102b discriminates whether or not the location registration request made in step 8h has been accepted. If the location registration request has not been accepted, the reselection control unit 102b proceeds to step 8j. If the location registration request has been accepted and if the location registration does not need to be executed, the reselection control unit 102b controls the transmitting-receiving unit 200 and the signal processing unit 300 to establish communications with the base station BS, start camping for an incoming call, and ends this process, according to a predetermined protocol.

In step 8j, the reselection control unit 102b discriminates whether or not the notification information has been received in step 8g at, at least, one time in relation to all the PSC included in the candidate list created In step 8b. If the notification information has been received at, at least, one time, the reselection control unit 102b ends this process. Then, if it is discriminated that the reselection of the cells is required again at a next discontinuous reception, the reselection control unit 102b executes this flow from the first step. If the notification information has not been received in relation to all the PSC, the reselection control unit 102b proceeds to step 8d.

In the mobile radio terminal having the above-described configuration, the PSC used in the roaming prohibition cell is prestored. After that, if the selection of the cells is required for the reason that the receiving conditions become worse or other reasons, the PSC of the neighbor cells are detected and listed as candidates, the notification information is received from the cell using the PSC other than the roaming prohibition cell in the list, and the reselection is executed.

Therefore, since the notification information is received by positively using the PSC other than the PSC of the cell which has been discriminated as the roaming prohibition cell, reception of the notification information from the roaming prohibition cell is restricted even if the roaming prohibition cell is detected as the neighbor cell (candidate for the reselection).

For this reason, even if roaming is prohibited in each cell, reception of the notification information from the roaming prohibition cell which cannot consequently carry out the reselection is restricted (limited) and unnecessary electric power to be wasted for this process can be reduced. In addition, delay in detecting the cell due to unnecessary reception of the notification information can be prevented.

In general, since the PSC is repeatedly used in the same network, the cell cannot be uniquely distinguished according to the PSC but, normally, the assignment of the PSC to the cell is executed such that the same PSC is not used in a plurality of cells in a comparatively small region. However, since the PSC is finite, the same PSC may be repeatedly used in the entire network. In other words, the PSC used in the roaming prohibition cell may be used in a remote cell where roaming can be executed. If it is used as the PSC of the roaming prohibition cell, inconvenience may be caused at the moving mobile radio terminal.

In the mobile radio terminal having the above-described configuration, however, if the PSC included in the candidate list of the neighbor cell is the PSC of the roaming prohibition cell, the notification information is received from the cell using the PSC after the time to prohibit the reselection has elapsed.

For this reason, even if the mobile radio terminal moves to the cell where roaming can be executed and which uses the same PSC as the PSC of the roaming prohibition cell, the notification information can be received when the prohibition time has elapsed. The above inconvenience can be thereby prevented.

In the second embodiment, the notification information is not received definitely until the end time of reselection prohibition has elapsed, but the invention is not limited to this. For example, if counting is executed for each candidate and the count value reaches a predetermined value, as described in the first embodiment, the notification information may be received irrespective of the end time of reselection prohibition.

In addition, in the second embodiment, the time to prohibit the reselection is set for each cell where roaming is prohibited, in step 7f, and it is discriminated in step 8f whether the prohibition time has elapsed. Instead of this, however, the timer to prohibit the reselection may be started for each cell where roaming is prohibited, in step 7f, and it may be discriminated in step 8f whether the timer counts a predetermined time or the timer stops after counting a predetermined time.

(Third Embodiment)

Next, a mobile radio terminal according to the third embodiment of the present invention will be described.

Figures 9, 10:
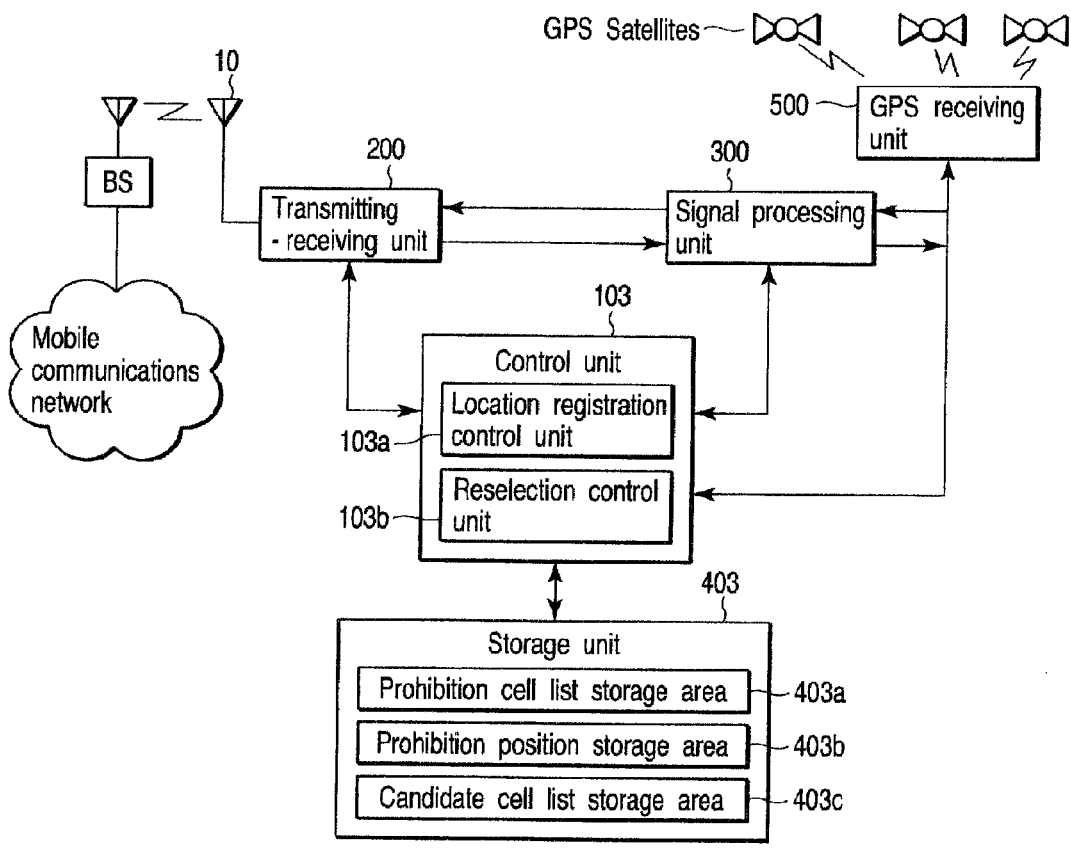
FIG. 9 is a block diagram showing a configuration of a mobile radio terminal according to a third embodiment of the present invention.
FIG. 10 is an illustration describing information stored in a storage unit of the mobile radio terminal shown in FIG. 9.

FIG. 9 shows a configuration of a mobile radio terminal according to the second embodiment.

The mobile radio terminal comprises an antenna 10, a transmitting-receiving unit 200, a signal processing unit 300, a storage unit 403, a control unit 103 and a GPS (Global Positioning System) receiving unit 500. The mobile radio terminal is employed in, for example, a mobile radio communications system of W-CDMA (Wideband Code Division Multiple Access) to execute speech communications and data communications.

The transmitting-receiving unit 200 executes radio communications in W-CDMA with the base station BS accommodated in a mobile communications network via the antenna 10. More specifically, a carrier frequency and PSC are directed to the transmitting-receiving unit 200 by the control unit 103, on the basis of a modulation signal generated by the signal processing unit 300, and the transmitting-receiving unit 200 generates a radio signal of the carrier frequency by using the PSC.

In addition, a carrier frequency and PSC are directed to the transmitting-receiving unit 200 by the control unit 103, and the transmitting-receiving unit 200 receives a radio signal of the carrier frequency by using the PSC. The result of reception is output to the signal processing unit 300 and the control unit 103. The transmitting-receiving unit 200 has a function of detecting quality of the received signal, and notifies the detected receiving quality to the control unit 103.

The signal processing unit 300 encodes a transmission speech signal. The signal processing unit 300 also generates the modulation signal on the basis of the speech data and the other data obtained by encoding, and outputs the modulation signal to the transmitting-receiving unit 200. In addition, the signal processing unit 300 demodulates the signal received by the transmitting-receiving unit 200 and decodes the result of modulation to obtain speech data and the like and detect the signal transmitted from the base station BS.

The storage unit 403 stores control programs and control data of the mobile radio terminal, inherent identification information assigned to the mobile radio terminal and the user, and a number of PSC (Primary Scrambling Code), besides telephone book data associating names with telephone numbers, data obtained from data communications, and downloaded data. The storage unit 403 comprises a prohibition cell list storage area 403*a*, a prohibition position storage area 403*b*, a candidate cell list storage area 403*c* and the like.

The prohibition cell list storage area 403*a* stores identification information PN of PSC used for communications in a cell where roaming is prohibited, as shown in FIG. 10. In this example, the prohibition cell list storage area 403*a* stores identification information of five PSC $PN_1$-$PN_5$, and older information is erased when new information is stored.

The prohibition position storage area 403*b* is an area where cell position data Pm is stored by each PSC used for the communications in the cell in which roaming is prohibited, as shown in FIG. 10. The candidate cell list storage area 403*c* is an area where a list of identification information of PSC of candidate cells arranged in the order of higher receiving quality is stored.

The GPS receiving unit 500 receives GPS signals transmitted from at least three GPS satellites and measures a position of the mobile radio terminal, in each preset cycle (for example, 1 second), and outputs position information (latitude, longitude and height) representing the measured position to the control unit 103. Instead of the GPS receiving unit 500, a receiving unit using service of measuring the position of the mobile radio terminal by the mobile communications network and the base station BS and obtaining the position information provided by the service from the base station BS may be provided.

The control unit 303 controls all the units of the mobile radio terminal on the basis of the control programs and control data stored in the storage unit 403, executes control on a staying cell, requests the base station BS to execute the location registration, manages radio resources of the mobile radio terminal, and controls setting and opening of a radio connection. The control unit 103 has a function of measuring the time.

More specifically, the control unit 103 comprises a location registration control unit 103*a* configured to execute the location registration for the base station BS if necessary, a reselection control unit 103*b* configured to execute the reselection of cells if the receiving condition becomes worse, and the like.

The mobile radio terminal comprises a speaker configured to output a reception speech signal, a microphone configured to input a transmission speech signal, a unit configured to convert the speech data into the reception speech signal, a unit configured to convert the transmission speech signal into the speech data, a display unit configured to display images on the basis of the reception data, an operation unit configured to accept a request from the user, and the like, though they are not shown in FIG. 9.

Next, operations of the mobile radio terminal having the above-explained configuration will be described. In the following descriptions, steps of establishing a communications link with the base station BS, control to implement speech communications and data communications, and registration, calling and edition of telephone book data and the like are omitted, but operations relating to location registration and reselection are described.

Figure 11:
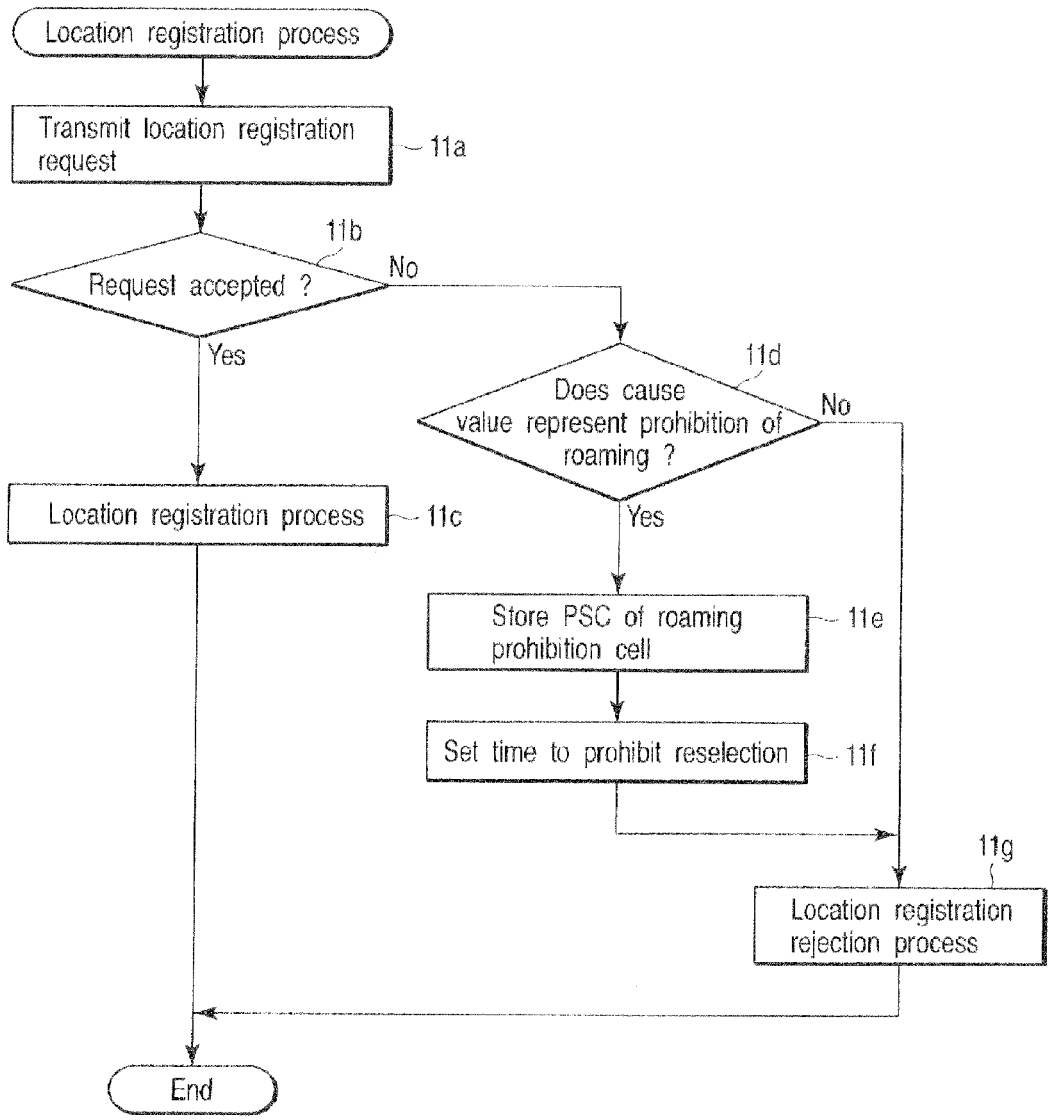
FIG. 11 is a flowchart describing a location registration process of the mobile radio terminal shown in FIG. 9.

FIG. 11 shows a flowchart of a location registration process, which is executed by the location registration control unit 103*a* of the control unit 103. A control program for implementing a control represented by the flowchart is stored in the storage unit 403. This process is implemented if a cell for location registration can be specified.

First, in step 11*a*, the location registration control unit 103*a* controls the transmitting-receiving unit 200 to transmit a location registration request to a cell which is specified by the control unit 103 and is to be subjected to location registration (for example, a cell having preferable receiving quality detected by the transmitting-receiving unit 200, as a result of the cell search). The location registration control unit 103*a* proceeds to step 11*b*.

The transmitting-receiving unit 200 transmits the location registration request to the cell (base station BS). More specifically, the location registration control unit 103*a* notifies the transmitting-receiving unit 200 of PSC used in the cell which is to be subjected to location registration. The transmitting-receiving unit 200 makes the location registration request to the cell by transmitting the location registration request by using the notified PSC.

In step 11*b*, the location registration control unit 103*a* controls the transmitting-receiving unit 200 to receive a response signal responding to the location registration request from the cell. More specifically, the location registration control unit 103*a* notifies the identification information of the PSC used in the cell to the transmitting-receiving unit 200, and the transmitting-receiving unit 200 receives the response signal by using the PSC corresponding to the notified identification information.

The location registration control unit 103*a* refers to the response signal from the cell detected by the signal processing unit 300 and discriminates whether or not the cell accepts the location registration request made in step 11*a*. If the response signal indicates the cell accepts (permits) the location registration request, the location registration control unit 103*a* proceeds to step 11*c*. If the response signal, indicates the cell does not accept (rejects) the location registration request, the location registration control unit 103*a* proceeds to step 11*d*.

In step 11*c*, the location registration control unit 103*a* controls the transmitting-receiving unit 200 and the signal processing unit 300 to execute the location registration process and end this process. More specifically, in the location registration process, the location registration control unit 103*a* establishes communications with the base station BS belonging to the cell, transmits the identification information of the own terminal and the like, and executes registration in the position management database in the network.

In step 11*d*, the location registration control unit 103*a* refers to a cause value included in the response signal received from the cell and detects the reason why the location registration request has not been accepted. The location registration control unit 103*a* proceeds to step 11*e* if the cause value represents prohibition of roaming or proceeds to step 11*g* if the cause value represents elements other than prohibition of roaming.

In step 11*e*, the location registration control unit 103*a* stores identification information $PN_n$ of the PSC corresponding to the cell where roaming is prohibited, in the prohibition cell list storage area 403*a*. Then, the location registration control unit 103*a* proceeds to step 11*f*.

In step 11*f*, the location registration control unit 103*a* detects the position information of the cell where roaming is prohibited, on the basis of the position information measured by the GPS receiving unit 500, and stores the detected position information as prohibited position data in association with the PSC stored in step 11*e*, in the prohibition position storage area 403*b*. The location registration control unit 103*a* proceeds to step 11*g*.

In step 11g, the location registration control unit 103a executes a location registration refection process and ends this process. More specifically, in the location registration rejection process, the location registration control unit 103a erases the identification information of the area, and stores the identification informatics of the network and the area in the prohibition network list and the prohibition area list, in accordance with the cause value, and ends the location registration process. These processes are provided in 3GPP STANDARDS TS24.018, TS25.331, TS25.304, TS24.008.

Figure 12:
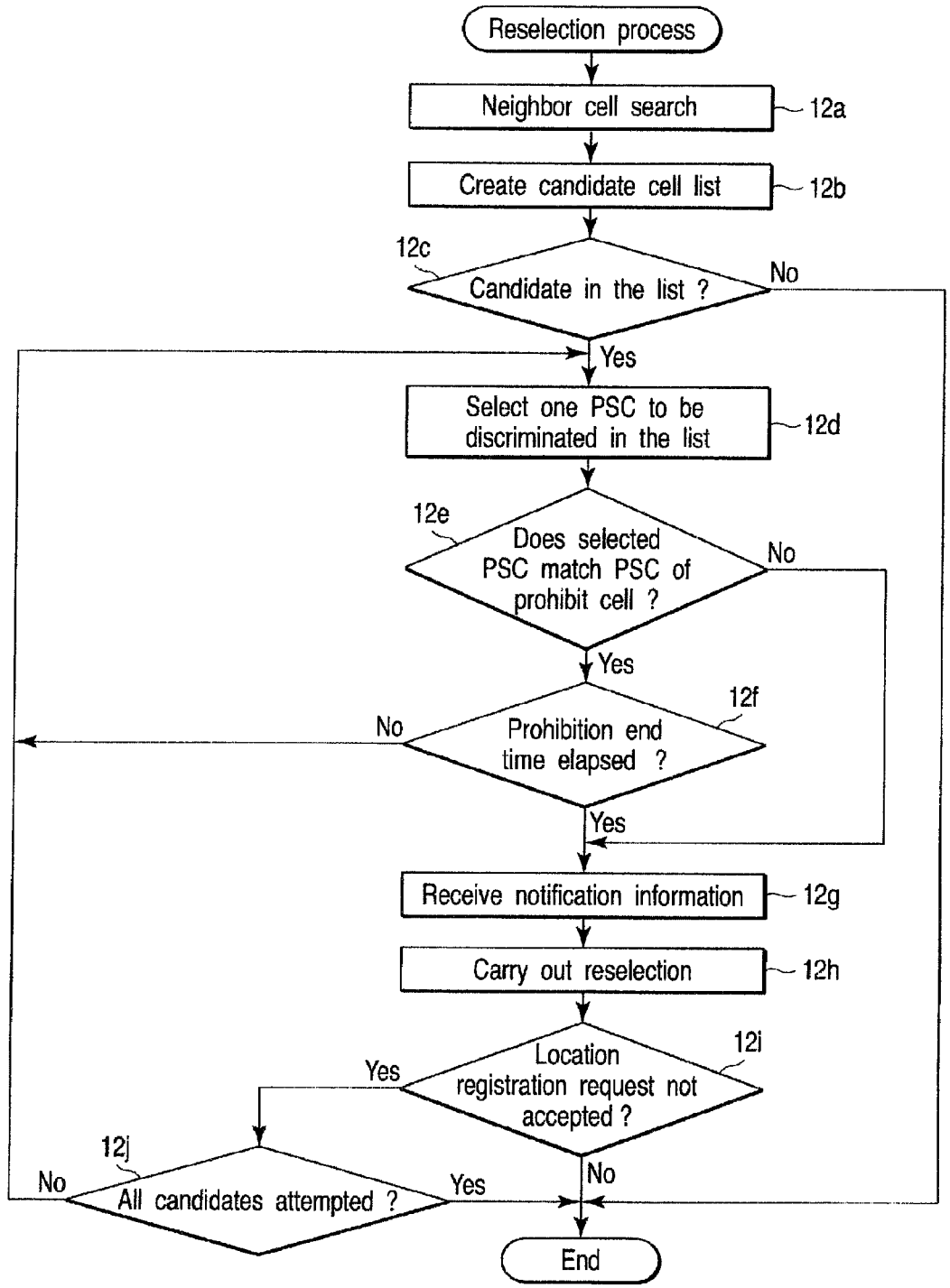
FIG. 12 is a flowchart describing a reselection process of the mobile radio terminal shown in FIG. 9.

FIG. 12 is a flowchart showing the reselection process, which is executed by the reselection control unit 103b of the control unit 103. A control program for implementing a control shown in the flowchart is stored in the storage unit 403. This process is executes when it is discriminated that the reselection of cells needs to be executed since the receiving quality of the currently serving cell is deteriorated, for example, when it is discriminated that the reselection of cells needs to be executed at every discrimination of the receiving quality of the currently serving cell at every discontinuous reception.

First, in step 12a, the reselection control unit 103b notifies the transmitting-receiving unit 200 of the identification of a plurality of PSC to urge the transmitting-receiving unit 200 to execute neighbor cell search. Then, the reselection control unit 103b proceeds to step 12b. The transmitting-receiving unit 200 receives pilot signals transmitted from the cell and detects their receiving qualities, by sequentially using PSC corresponding to the identification information notified by the reselection control unit 103b, and notifies the control unit 103 of the detected receiving qualities together with the identification information of the PSC.

In step 12b, the reselection control unit 103b detects the PSC by which receiving qualities higher than predetermined receiving qualities can be obtained, on the basis of the receiving qualifies notified by the transmitting-receiving unit 200 in step 12a, creates a candidate list in which elements of the identification information of the detected PSC are arranged in an order of higher receiving qualities, and stores the candidate list in the candidate cell list storage area 403c. Then, the reselection control unit 103b proceeds to step 12c. In other words, in step 12b, the reselection control unit 103b creates a candidate list in which the PSC considered desirable as candidates of the reselection are arranged in an order of higher possibilities.

In step 12c, the reselection control unit 103b discriminates whether or not the identification information of at least one PSC is included in the candidate list created in step 12b. If the identification information of at least one PSC is included in the candidate list, the reselection control unit 103b proceeds to step 12d. If the candidate list does not include the identification information of any PSC, the reselection control unit 103b ends the process. If it is discriminated that the reselection of cells needs to be executed again at a next discontinuous reception time, the reselection control unit 103b executes this flow from the first step.

In step 12d, the reselection control unit 103b selects one PSC, in the candidate list stored in the candidate cell list storage area 403c, and proceeds to step 12e. When the reselection control unit 103b proceeds from step 12c to step 12d, the reselection control unit 103b selects the PSC of the highest order in the candidate list. When the reselection control unit 103b proceeds from step 12f or step 12j to step 12d, the reselection control unit 103b selects the PSC of the order next to the PSC selected in previous step 12d.

In other words, for example, if the reselection control unit 103b selects the PSC of the highest order in previous step 12d, the reselection control unit 103b selects the PSC of the second order in current step 12d. If the reselection control unit 103b selects the PSC of the third order in previous step 12d, the reselection control unit 103b selects the PSC of the fourth order in current step 12d. If the reselection control unit 103b selects the PSC of the lowest (fifth) order in previous step 12d, the reselection control unit 103b selects the PSC of the highest (first) order in current step 12d.

In step 12e, the reselection control unit 103b discriminates whether or not the identification information $PN_x$ of the PSC selected in step 12d is stored in the prohibition cell list storage area 403a. If the identification information $PN_x$ matches any one of $PN_1$-$PN_5$ stored in the prohibition cell list storage area 403a, i.e. if the identification information $PN_x$ is the PSC of the prohibition cell, the reselection control unit 103b proceeds to step 12f. If the identification information $PN_x$ does not match any one of $PN_1$-$PN_5$, i.e. if the identification information $PN_x$ is not the PSC of the prohibition cell, the reselection control unit 103b proceeds to step 12g.

In step 12f, the reselection control unit 103b compares the position data $P_x$ of the prohibition position storage area 403b corresponding to the identification information $PN_x$ of the PSC selected in step 12d, with the current position information obtained from the GPS receiving unit 500, and discriminates whether or not the current position is separated from the position represented by the position data $P_x$ in a preset distance Z meters or more. If the current position is separated from the position represented by the position data $P_x$ in a preset distance Z meters or more, the reselection control unit 103b proceeds to step 12g. If the current position is separated from the position represented by the position data $P_x$ in less than Z meters, the reselection control unit 103b proceeds to step 12d.

In step 12g, the reselection control unit 103b notifies the transmitting-receiving unit 200 of the identification information $PN_x$ of the PSC selected in step 12d, and controls the transmitting-receiving unit 200 to receive the identification information transmitted from the cell using the PSC. Then, the reselection control unit 103b proceeds to step 12h. The transmitting-receiving unit 200 executes the reception using the PSC corresponding to the identification information notified by the reselection control unit 103b, and the signal processing unit 300 thereby detects the notification information from the received signal.

The reselection control unit 103b executes the reselection process in step 12h, and then proceeds to step 12i. The reselection process includes processes of reading the location registration area number from the notification information received in step 12g and, if the location registration area number is different from the currently registered location registration area number, controlling the transmitting-receiving unit 200 and the signal processing unit 300 to transmit the location registration request to the base station BS that has transmitted the notification information received in step 12g, under a predetermined protocol.

In step 12i, the reselection control unit 103b discriminates whether or not the location registration request made in step 12h has been accepted. If the location registration request has not been accepted, the reselection control unit 103b proceeds to step 12j. If the location registration request has been accepted and if the location registration does not need to be executed, the reselection control unit 103b controls the transmitting-receiving unit 200 and the signal processing unit 300 to establish communications with the base station BS, start camping for an incoming call, and ends this process, according to a predetermined protocol.

In step 12*j*, the reselection control unit 103*b* discriminates whether or not the notification information has been received in step 12*g* at, at least, one time in relation to all the PSC included in the candidate list created in step 12*b*. If the notification information has been received at, at least, one time, the reselection control unit 103*b* ends this process. Then, if it is discriminated that the reselection of the cells is required again at a next discontinuous reception, the reselection control unit 103*b* executes this flow from the first step. If the notification information has not been received in relation to all the PSC, the reselection control unit 103*b* proceeds to step 12*d*.

In the mobile radio terminal having the above-described configuration, the PSC used in the roaming prohibition cell is prestored. After that, if the selection of the cells is required for the reason that the receiving conditions become worse or other reasons, the PSC of the neighbor cells are detected and listed as candidates, the notification information is received from the cell using the PSC other than the roaming prohibition cell in the list, and the reselection is executed.

Therefore, since the notification information is received by positively using the PSC other than the PSC of the cell which has been discriminated as the roaming prohibition cell, reception of the notification information from the roaming prohibition cell is restricted even if the roaming prohibition cell is detected as the neighbor cell (candidate for the reselection).

For this reason, even if roaming is prohibited in each cell, reception of the notification information from the roaming prohibition cell which cannot consequently carry out the reselection is restricted (limited) and unnecessary electric power to be wasted for this process can be reduced. In addition, delay in detecting the cell due to unnecessary reception of the notification information can be prevented.

In general, since the PSC is repeatedly used in the same network, the cell cannot be uniquely distinguished according to the PSC but, normally, the assignment of the PSC to the cell is executed such that the same PSC is not used in a plurality of cells in a comparatively small region. However, since the PSC is finite, the same PSC may be repeatedly used in the entire network. In other words, the PSC used in the roaming prohibition cell may be used in a remote cell where roaming can be executed. If it is used as the PSC of the roaming prohibition cell, inconvenience may be caused at the moving mobile radio terminal.

In the mobile radio terminal having the above-described configuration, however, if the current position is remote from the position where the roaming prohibition cell is detected, in a preset distance Z or more, the notification information is received from the cell using the PSC.

For this reason, even if the mobile radio terminal moves to the cell where roaming can be executed and which uses the same PSC as the PSC of the roaming prohibition cell, the notification information can be received when mobile radio terminal moves in a preset distance, Z meters or more. The above inconvenience can be thereby prevented.

In the third embodiment, the notification information is not received definitely unless the mobile radio terminal is remote from the roaming prohibition cell in a predetermined distance Z or more, but the invention is not limited to this. For example, when counting is executed for each candidate and the count value reaches a predetermined value, as described in the first embodiment, the notification information may be received even if the mobile radio terminal is not remote from the roaming prohibition cell in a predetermined distance Z or more. In other words, the third embodiment can also be applied to the first embodiment or the second embodiment.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

For example, in the above-described embodiments, the PSC used in the cell where roaming is prohibited is stored and the cell where roaming is prohibited is discriminated on the basis of the stored PSC. In addition to this, the frequency used in the cell where roaming is prohibited is also stored, and the roaming prohibition cell is discriminated in terms of both the PSC and the frequency, to restrict (limit) reception of the notification information.

In other words, if the roaming request is not accepted by the cell, the frequency used for the roaming request is stored as the prohibited frequency in association with the PSC used in the cell where roaming is prohibited (steps 3*e*, 7*e*, 11*e*). In the reselection process, sets of the PSC of the candidate cells end the used frequencies are listed (steps 4*b*, 8*b*, 12*b*), one of the sets is selected (steps 4*d*, 8*d*, 12*d*), and it is discriminated whether the selected set is stored as the PSC used in the cell where roaming is prohibited, and the prohibited frequency (steps 4*e*, 8*e*, 12*e*).

Even by this control, reception of the notification information from the roaming prohibition cell where the reselection cannon be consequently carried out is restricted (limited), and unnecessary electric power to be wasted for this process can be reduced. In addition, delay on the cell detection caused by unnecessary reception of the notification information can be prevented.

Moreover, in the above-described embodiments, reception of the notification information is limited irrespective of the outgoing request from the user. However, when the user makes an emergency outgoing call to a police station or a fire station, the notification information may be sequentially received from the PSC having the higher receiving qualities, without limiting the cells (PSC) receiving the notification information. Special numbers for emergency outgoing calls are prestored in storing units 401 to 403, for the discrimination of the emergency outgoing calls. If the special number is input via the operating unit, the control units 101 to 103 discriminate the input as the emergency outgoing call.

Needless to say, the present invention can also be variously modified within a scope which does not depart from the gist of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A mobile radio terminal, configured to establish radio communications with a base station which is accommodated in a mobile communications network and which forms a cell, comprising:
    a storage unit configured to store a first list including identification information of a primary scrambling code (PSC) of a roaming prohibition cell where roaming is rejected;

a location registration control unit configured to determine whether a cause value included in a response signal to a location registration request returned from the mobile communications network represents prohibition of roaming, store the identification information of the PSC corresponding to the cell where the roaming is prohibited in the storage unit, and set time to prohibit reselection associated with the PSC of the prohibited cell; and a detecting reselection control unit configured to determine whether a receiving quality from the base station is deteriorated and determine whether notification information has been received from neighbor cells, wherein when the reselection control unit determines that the receiving quality from the base station is deteriorated, the reselection control unit is configured to detect reception qualities of neighbor cells, create a second list including one or more of a plurality of PSCs of the neighbor cells based on the reception qualities, select a target PSC from the second list, and reselect a target neighbor cell corresponding to the target PSC;

wherein when the reselection control unit selects the target PSC, one PSC at a time in the second list is selected and its identification information is compared to the identification information of the PSC stored in the first list;

wherein when the identification information are not matched, a notification information will be received from the neighbor cells;

wherein when the identification information are matched, the set time to prohibit reselection is checked;

wherein when the set time to prohibit reselection is elapsed, the notification information will be received from the neighbor cells; and wherein when the set time to prohibit reselection is not elapsed, another PSC will be reselected.

2. The terminal according to claim 1, wherein the terminal discontinuously receives the notification information on a cell having identification information stored in the storage unit, of the cells detected by the reselection control unit.

3. The terminal according to claim 1, wherein after a certain time has elapsed, the terminal receives the notification information on a cell having identification information stored in the storage unit, of the cells detected by the reselection control unit.

4. The terminal according to claim 1, further comprising a position detecting unit which detects a position, wherein if roaming is rejected by a cell, the storage unit stores information on the position detected by the position detecting unit in association with identification of the cell where roaming is rejected; and the reselection control unit compares information on the position associated with the identification information on the cell having the identification information stored in the storage unit, of the cells detected by the reselection control unit, with information on a current position detected by the position detecting unit and receives the notification information from the roaming prohibition cell if a distance between the position associated with the identification information and the current position detected by the position detecting unit is greater than or equal to a preset distance.

5. The terminal according to claim 1, wherein the storage unit stores the identification information of the cell where roaming is rejected, in association with a frequency used in the cell, and if the neighbor cells detected by the reselection control unit have identification information stored in the storage unit and if a frequency associated with the identification information is a frequency used at the detection by the reselection control unit, the terminal does not receive the notification information from the neighbor cells detected by the reselection control unit.

6. The terminal according to claim 1, further comprising a storage control unit which, if the terminal receives the notification information and roaming is not rejected, deletes the identification information of the neighbor cells detected by the reselection control unit.

7. The terminal according to claim 1, wherein the storage unit stores the identification information of the cell where roaming is rejected, at location registration.

8. The terminal according to claim 1, wherein the storage unit stores a spread code to be used for communications with the cell, as identification information of the cell where roaming is rejected.

9. A mobile radio terminal, configured to establish radio communications with a base station which is accommodated in a mobile communications network and which forms a cell, comprising:

a storage unit configured to store a first list including identification information of a primary scrambling code (PSC) of a roaming prohibition cell where roaming is rejected;

a location registration control unit configured to determine whether a cause value included in a response signal to a location registration request returned from the mobile communications network represents prohibition of roaming, store the identification information of the PSC corresponding to the cell where the roaming is prohibited in the storage unit, and set time to prohibit reselection associated with the PSC of the prohibited cell;

and a reselection control unit configured to determine whether a receiving quality from the base station is deteriorated and determine whether notification information has been received from neighbor cells, wherein when the reselection control unit determines that the receiving quality from the base station is deteriorated, the reselection control unit is configured to detect reception qualities of neighbor cells, create a second list including one or more of a plurality of PSCs of the neighbor cells based on the reception qualities, select a target PSC from the second list, and reselect a target neighbor cell corresponding to the target PSC;

wherein when the reselection control unit selects the target PSC, one PSC at a time in the second list is selected and its identification information is compared to the identification information of the PSC stored in the first list;

wherein when the identification information are not matched, a notification information will be received from the neighbor cells;

wherein when the identification information are matched, the set time to prohibit reselection is checked;

wherein when the set time to prohibit reselection is elapsed, the notification information will be received from the neighbor cells; and wherein when the set time to prohibit reselection is not elapsed, another PSC will be reselected.

10. The terminal according to claim 9, wherein the terminal lowers the receiving frequency by discontinuously receiving the notification information on a cell having identification information stored in the storage unit, of the cells detected by the reselection control unit.

11. The terminal according to claim 9, wherein after a certain time has elapsed, the terminal lowers a receiving frequency by receiving the notification information on a cell having identification information stored in the storage unit, of the cells detected by the reselection control unit.

12. The terminal according to claim 9, further comprising a position detecting unit which detects position, wherein
if roaming is rejected by a cell, the storage unit stores information on the position detected by the position detecting unit in association with identification of the cell where roaming is rejected; and
the reselection control unit compares information on the position associated with the identification information on the cell having the identification information stored in the storage unit, of the cells detected by the reselection control unit, with information on a current position detected by the position detecting unit and lowers the receiving frequency of the notification information from the roaming prohibition cell if a distance between the position associated with the identification information and the current position detected by the position detecting unit is less than or equal to a preset distance.

13. The terminal according to claim 9, wherein
the storage unit stores the identification information of the cell where roaming is rejected, in association with a frequency used in the cell, and
if the neighbor cells detected by the reselection control unit have identification information stored in the storage unit and if a frequency associated with the identification information is a frequency used at the detection by the reselection control unit, the terminal lowers the receiving quality and receives the notification information from the neighbor cells detected by the reselection control unit.

14. The terminal according to claim 9, further comprising a storage control unit which, if the terminal lowers the receiving frequency and receives the notification information and roaming is not rejected, deletes the identification information of the neighbor cells detected by the reselection control unit.

15. The terminal according to claim 9, wherein the storage unit stores the identification information of the cell where roaming is rejected, at location registration.

16. The terminal according to claim 9, wherein the storage unit stores a spread code to be used for communications with the cell, as identification information of the cell where roaming is rejected.

17. A mobile radio terminal, configured to establish radio communications with a base station which is accommodated in a mobile communications network and which forms a cell, comprising: a storage unit configured to store a first list including identification information of a primary scrambling code (PSC) of a roaming prohibition cell where roaming is rejected; a location registration control unit configured to determine whether a cause value included in a response signal to a location registration request returned from the mobile communications network represents prohibition of roaming, store the identification information of the PSC corresponding to the cell where the roaming is prohibited in the storage unit and set time to prohibit reselection associated with the PSC of the prohibited cell; and a detecting reselection control unit configured to determine whether a receiving quality from the base station is deteriorated and determine whether notification information has been received from neighbor cells, wherein when the reselection control unit determines that the receiving quality from the base station is deteriorated, the reselection control unit is configured to detect reception qualities of neighbor cells, create a second list including one or more of a plurality of PSCs of the neighbor cells based on the reception qualities, select a target PSC from the second list, and reselect a target neighbor cell corresponding to the target PSC; wherein when the reselection control unit selects the target PSC, one PSC at a time in the second list is selected and its identification information is compared to the identification information of the PSC stored in the first list;
wherein when the identification information are not matched, a notification information will be received from the neighbor cells; wherein when the identification information are matched, the set time to prohibit reselection is checked; wherein when the set time to prohibit reselection is elapsed, the notification information will be received from the neighbor cells; and wherein when the set time to prohibit reselection is not elapsed, another PSC will be reselected.

18. The terminal according to claim 17, wherein the terminal limits the reception by discontinuously receiving the notification information on a cell having identification information stored in the storage unit, of the cells detected by the reselection control unit.

19. The terminal according to claim 17, wherein after a certain time has elapsed, the terminal limits the reception by receiving the notification information on a cell having identification information stored in the storage unit, of the cells detected by the reselection control unit.

20. The terminal according to claim 17, further comprising a position detecting unit which detects a position, wherein
if roaming is rejected by a cell, the storage unit stores information on the position detected by the position detecting unit in association with identification of the cell where roaming is rejected; and
the reselection control unit compares information on the position associated with the identification information on the cell having the identification information stored in the storage unit, of the cells detected by the reselection control unit, with information on a current position detected by the position detecting unit and limits the reception of the notification information from the roaming prohibition cell if a distance between the position associated with the identification information and the current position detected by the position detecting unit is less than or equal to a preset distance.

21. The terminal according to claim 17, wherein
the storage unit stores the identification information of the cell where roaming is rejected, in association with a frequency used in the cell, and
if the neighbor cells detected by the reselection control unit have identification information stored in the storage unit and if a frequency associated with the identification information is a frequency used at the detection by the reselection control unit, the terminal limits the reception of the notification information from the neighbor cells detected by the reselection control unit.

22. The terminal according to claim 17, further comprising a storage control unit which, if the terminal limits the reception of the notification information and roaming is not rejected, deletes the identification information of the neighbor cells detected by the reselection control unit.

23. The terminal according to claim 17, wherein the storage unit stores the identification information of the cell where roaming is rejected, at location registration.

24. The terminal according to claim 17, wherein the storage unit stores a spread code to be used for communications with the cell, as identification information of the cell where roaming is rejected.

* * * * *